July 16, 1946.  W. H. GILLE  2,403,917
CONTROL APPARATUS
Filed April 20, 1942  3 Sheets-Sheet 1
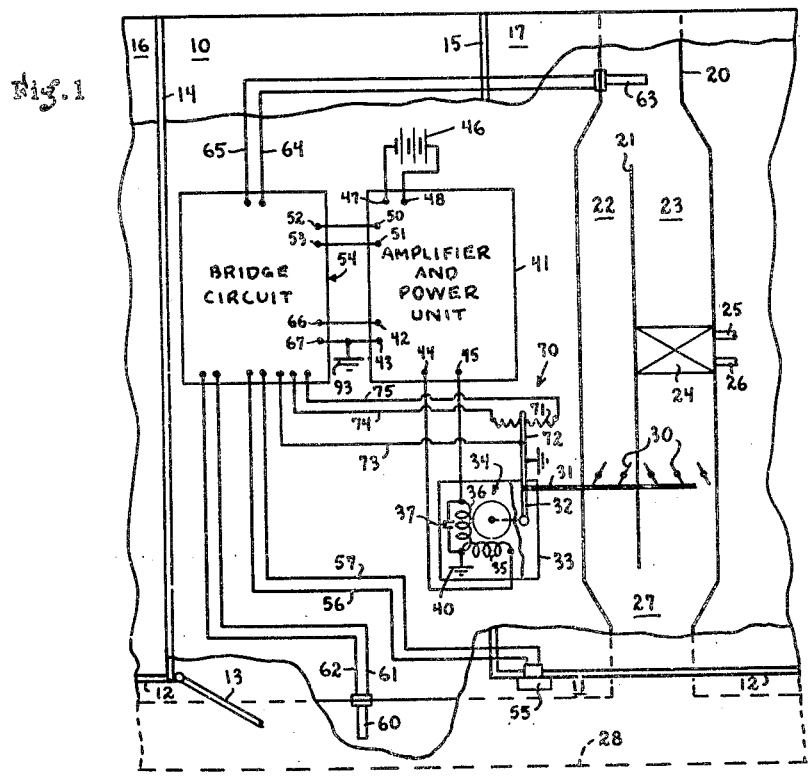
Inventor
Willis H. Gille
By George H. Fisher
Attorney July 16, 1946.　　W. H. GILLE　　2,403,917
CONTROL APPARATUS
Filed April 20, 1942　　3 Sheets-Sheet 2
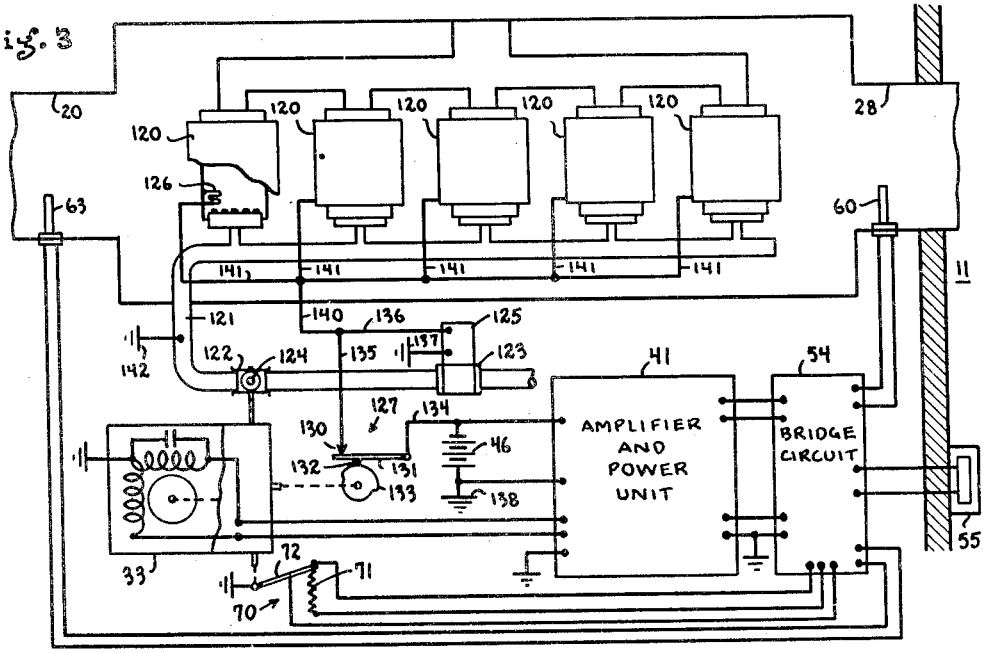
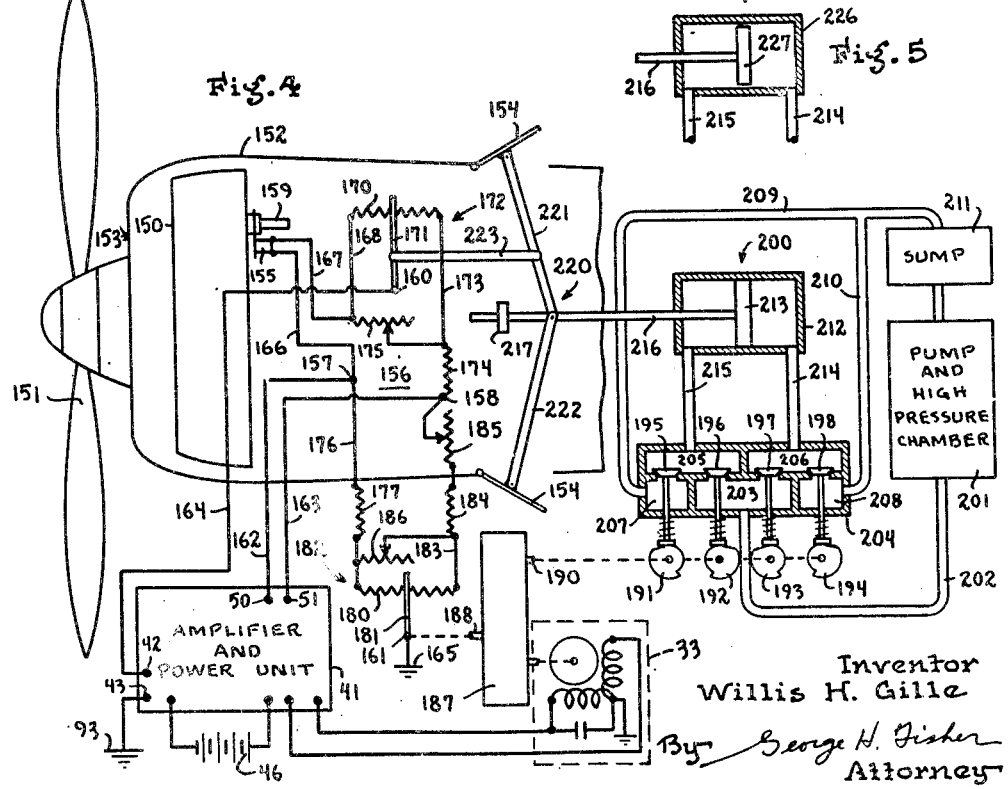
Inventor
Willis H. Gille
By George H. Fisher
Attorney

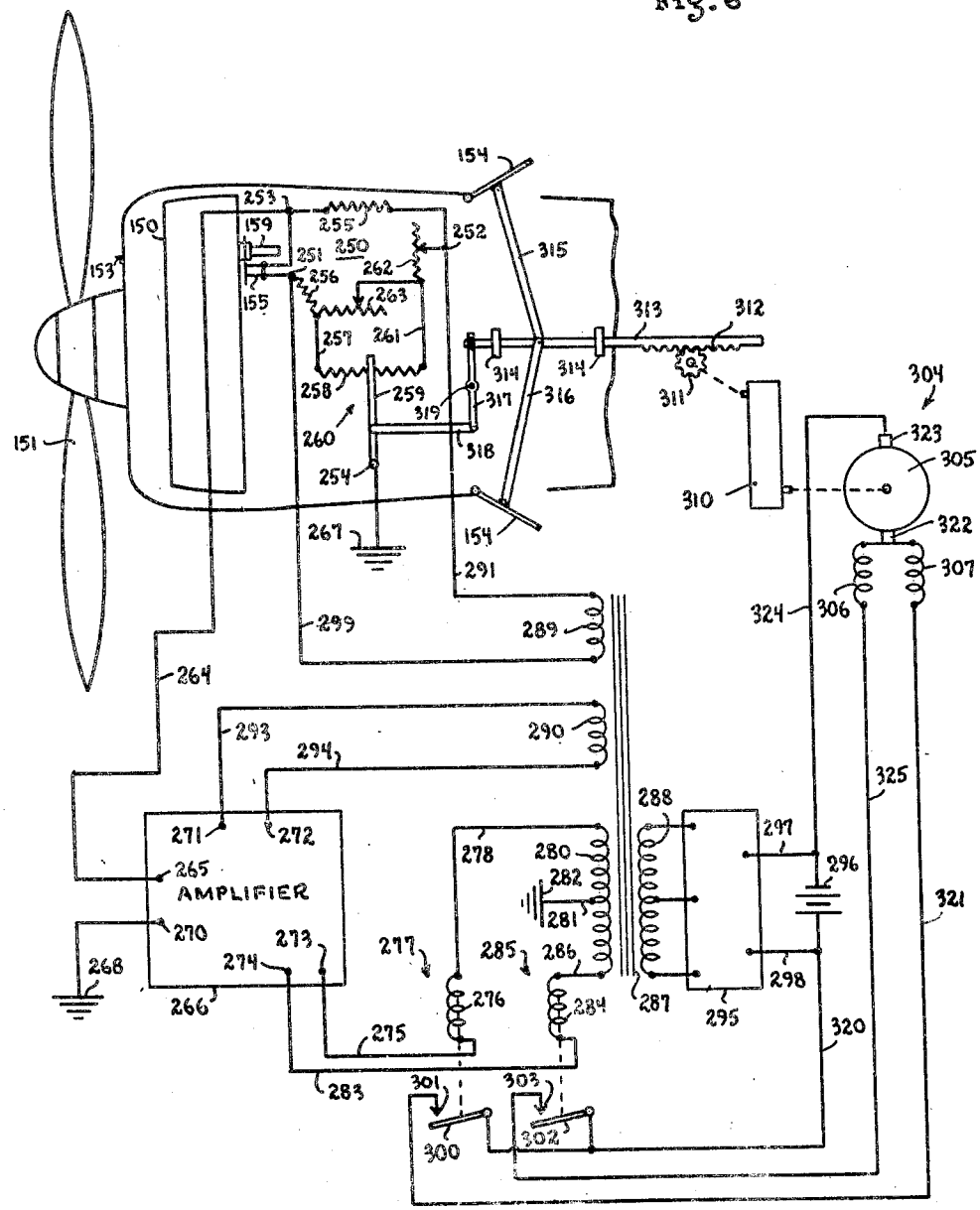

Patented July 16, 1946

2,403,917

UNITED STATES PATENT OFFICE 2,403,917

CONTROL APPARATUS

Willis H. Gille, St. Paul, Minn., assignor to Minneapolis-Honeywell Regulator Company, Minneapolis, Minn., a corporation of Delaware Application April 20, 1942, Serial No. 439,673

19 Claims. (Cl. 236—1)

The present invention relates to temperature control systems, and more particularly to temperature control systems for use on aircraft.

The construction of a satifactory temperature control system for use on aircraft presents many unusual problems. For example, the space whose temperature is to be controlled is relatively small, its walls are quite thin, and it is subjected to rapid variations in outside temperature. If an even temperature is to be maintained within the aircraft, it is therefore necessary that a temperature responsive element be employed which responds rapidly to changes in temperature. Furthermore, it is necessary that the system controlled by the temperature responsive element also be capable of quick response. The required rapidity of response must be much greater than that required in buildings and vehicles operated on the ground, because the temperature changes encountered are much more rapid.

In addition to the requirement of high sensitivity, a practical temperature control system for use on aircraft must be insensitive to the changes in barometric pressure which occur with changes in altitude. It must also be insensitive to vibration, both of the high frequency type sometimes resulting from the operation of the aircraft engine, and the rough irregular bouncing encountered in rough air conditions. An aircraft temperature control system must also be light in weight and must produce no objectionable radio interference.

It is therefore an object of the present invention to provide an improved temperature control system for use on aircraft. A further object of the present invention is to provide a temperature control system which shall be very sensitive to temperature changes, while remaining insensitive to atmospheric pressure changes and to vibration.

Another object of the present invention is to provide an aircraft temperature control system which is light in weight and which does not produce objectionable radio interference.

Another object is to construct an automatic temperature control system which may be readily installed on existing aircraft to operate existing temperature changes devices of various types which are at present usually controlled manually.

A further object of the present invention is to provide an improved electrical control system for a hydraulic servo-motor. A still further object is to provide an improved control system for a rotary electrical motor adapted to operate valves controlling a hydraulic motor.

Another object of the present invention is to provide a system for controlling the temperature of an aircraft cabin. A further object is to provide, in such a control system, means for regulating the fuel supply to a heater.

Another object of the present invention is to provide an improved system for regulating the temperature of an aircraft engine.

Other objects and advantages of the present invention will become apparent from a consideration of the appended specification, claims, and drawings, in which Figure 1 represents a plan view of a section of an aircraft, showing the installation of a cabin temperature control system embodying my invention in a somewhat diagrammatic manner, Figure 2 is a circuit diagram showing in greater detail the connections of the bridge, amplifier, motor and power supply units used in the system disclosed in Figure 1, Figure 3 shows, somewhat diagrammatically, the application of my invention to a different type of aircraft cabin temperature control system.

Figure 4 illustrates somewhat diagrammatically the application of my invention to an aircraft engine temperature control system employing a hydraulic servo-motor.

Figure 5 shows a modified form of hydraulic motor which may be utilized in the system shown in Figure 4, and Figure 6 shows a different embodiment of my invention as applied to an aircraft engine temperature control system.

Referring to Figure 1, there is shown a plan view of a portion of an airplane. The view is taken looking downward at the floor of a companionway 10 between a passenger cabin 11 and a pilot's compartment (not shown). A wall 12, provided with a suitable door 13, separates the companionway from the passenger cabin. Walls 14 and 15 at the sides of the companionway 10 separate the latter from spaces 16 and 17, which may, for example, be used for cargo or baggage. Portions of the floor are shown in the drawings as broken away in order to better illustrate the temperature control systems, of which the chief parts are mounted under the floor.

An air intake duct 20, which may be connected with a suitable air intake (not shown) near the front of the plane, is divided by a wall 21, into a pair of parallel ducts 22 and 23. Air flowing through the duct 23 passes over a radiator 24, which may be supplied with a suitable heating fluid, for example steam, through supply and return pipes 25 and 26. The duct 22 is provided to by-pass fresh air around the heater 24. The parallel ducts 22 and 23 rejoin each other at 27 and are connected to a suitable distributing duct 28 in the cabin 11.

The relative amounts of air passing through the ducts 22 and 23 are controlled by a set of mixing dampers 30, suitably attached to an operating bar 31. The bar 31 is attached to a crank arm 32 driven by a motor mechanism 33. The motor mechanism 33 includes a split-phase motor 34, and a gear train (not shown).

The split-phase motor 34 includes a pair of windings 35 and 36, which are spaced 90 electrical degrees apart, in accordance with the conventional construction of such motors. A condenser 37 is connected in parallel with winding 36. The common terminal of windings 35 and 36 is grounded as at 40.

The capacitance of condenser 37 and the inductance of winding 36 are so proportioned that the two form a series resonant loop circuit. This loop circuit is supplied with energy by transformer action from winding 35, but the current flow in winding 36 caused by this transformer action is not sufficient, or of the proper phase relationship, to cause rotation of motor 34. When a slight additional amount of energy is supplied to winding 36, however, it is energized sufficiently to start rotation of motor 34 in a direction determined by the phase of the energy supplied by the amplifier.

Motor 34 is supplied with electrical energy from an amplifier and power unit generally indicated at 41. This unit has input terminals 42 and 43 and output terminals 44 and 45. Power is supplied to the amplifier and power unit 41 from a battery 46 through power supply terminals 47 and 48. The amplifier and power unit 41 also has terminals 50 and 51 through which electrical energy is conducted to input terminals 52 and 53 of a bridge circuit generally indicated at 54.

The bridge circuit 54 includes a first temperature responsive element 55, which may be an electrical resistance element having an appreciable temperature coefficient of resistance. The resistance element 55 is shown diagrammatically in Figure 1, and may be mounted on the wall 12. The particular form of the temperature responsive resistance element and the means for mounting it on the wall 12 may preferably be as described in the copending application of Russell H. Whempner, Serial No. 439,679, dated April 20, 1942. The resistance element 55 is connected to bridge circuit 54 by a pair of conductors 56 and 57.

A second temperature responsive resistance element 60 is mounted in the discharge duct 28 and is connected to the bridge circuit 54 by means of conductors 61 and 62. A third temperature responsive resistance element 63 is mounted in the intake duct 20 and is connected to bridge circuit 54 by means of conductors 64 and 65.

It has been found desirable that the temperature responsive element 55 should have the largest effect on the system, while the elements 60 and 63 should have smaller effects. The ratio between the effects of these elements on the system may be controlled by properly designing their relative resistances. For example, in one system built in accordance with the present invention, the cabin temperature responsive element had a resistance of 500 ohms at 70° F., while the compensating resistance elements had a resistance of about 25 ohms at the same temperature.

The ratio of the controlling effects of these resistances on the unbalance of the bridge was therefore about twenty to one. This ratio may vary considerably in particular installations, and the ratio between the resistance of the cabin temperature responsive element and that of the discharge temperature responsive element may be different than the ratio between the resistance of the cabin temperature responsive element and that of the outside temperature compensating element. It has been found, however, that the ratio should be at least ten to one in any case, and may be as high as fifty to one.

The bridge circuit 54 is provided with output terminals 66 and 67 connected to the input terminals 42 and 43 of the amplifier and power unit 41, respectively.

The bridge circuit 54 also includes a rebalancing potentiometer generally indicated at 70, having a slide wire resistance 71 and a slider 72 cooperating therewith. Slider 72 is connected to the bridge circuit through a conductor 73, while the end terminals of slide wire 71 are connected to the bridge circuit 54 through conductors 74 and 75.

Referring now to Figure 2, it will be seen that the upper left arm of bridge circuit 54 connects input terminal 52 with output terminal 66 and includes a manually adjustable resistance 80, conductor 57, temperature responsive resistance element 55, and conductor 56. The upper right arm of bridge circuit 54 connects output terminal 66 with input terminal 53 and includes a conductor 81, a fixed resistance 82, and a conductor 83. The lower left arm of bridge circuit 54 connects input terminal 52 and the slider 72, and includes a conductor 84, a fixed resistance 85, conductor 74, and that part of slide wire 71 between its left hand terminal and the slider 72. The lower right hand arm of bridge circuit 54 connects slider 72 and input terminal 53, and includes that portion of slide wire 71 between slider 72 and its right hand terminal, conductor 75, a fixed resistance 86, and temperature responsive resistance elements 60 and 63.

A variable resistance 87 is connected in parallel with slide wire 71. The function of resistance 87 is to determine the amount of movement of slider 72 required to correct a given unbalance of the bridge circuit 54.

The function of adjustable resistance 80 is to determine the value of temperature adjacent the resistance 55 at which the bridge 54 will be balanced. In other words, it operates to set the control point of the system.

The amplifier and power unit 41 includes an amplifier generally indicated at 90, which may be of any type well known in the art in which the phase of the output voltage is reversible with a reversal of the phase of the input voltage. A typical amplifier of this type is shown in the Beers Patent 2,020,275. Another desirable type of amplifier for this purpose is one of the type disclosed in Figure 1 of the copending application of Albert P. Upton, Serial No. 437,561, dated April 3, 1942. Amplifier 90 has input terminals 42 and 43 and output terminals 91 and 92. Bridge output terminal 66 is connected to amplifier input terminal 42 by a conductor 68. Bridge output terminal 67 is connected to amplifier input terminal 43 by a conductor 69. Input terminal 43 is grounded at 93, and also serves as an output terminal of the amplifier 90. It will be readily understood that the conductor 69 may be omitted, and bridge output terminal 67 connected to ground instead.

While the amplifier referred to in the above mentioned Upton application is one which has been found to be particularly desirable for use in the present apparatus, it is possible to employ any amplifier capable of supplying at the output terminals a voltage which reverses in phase with reversal of the phase of the out-put voltage of the bridge. Such amplifiers are well known in the prior art. It is accordingly not considered necessary to completely illustrate the details thereof. However in order to facilitate an understanding of the general operation of the amplifier, the final amplifier stage is indicated in the drawing. This stage is provided by a double triode tube 90a having two anodes 90b and 90c. A double cathode 91a is associated with both anodes 90b and 90c. Associated with anode 90b is a grid 92b and with anode 90c is a grid 92c. The cathode 91a is connected by a lead 97 to the input terminal 43 which in turn is connected to ground 93 as previously noted. The two grids 92b and 92c are connected together. The junction of the connection to these two grids is indicated by the reference numeral 94a. This junction is shown as being connected by a dotted line connection 95a to the input terminal 42. This connection is shown in dotted lines because in actual practice two or more stages of amplification would be provided between the input terminals 42 and 43 and the grids 92b and 92c. As far as the essential operation of the amplifier is concerned, however, it may be considered as though grids 92b and 92c are directly connected to the input terminal 42 and that the cathode 96 is directly connected by conductor 97 to terminal 43 and hence to ground.

Power is supplied to amplifier 90, bridge circuit 54, and motor 36 from battery 46 through an inverter 94 which may be of the well known vibrator type. Inverter 94 is connected to a primary winding 95 of a transformer 96 having secondary windings 100, 101, 102 and 103.

Secondary winding 100 supplies power to amplifier 90 through conductors 107 and 108.

Secondary winding 101 supplies power to amplifier 90 and to winding 36 of motor 34. A connection may be traced from the upper terminal of transformer winding 101 through a conductor 110 to amplifier output terminal 91. Another connection may be traced from the lower terminal of secondary winding 101 through a conductor 111 to amplifier output terminal 92. A third connection may be traced from the midpoint of secondary winding 101 through a conductor 112, terminal 45, a conductor 113, winding 36 and condenser 37 in parallel, ground connection 40, and ground connection 93 to amplifier terminal 43.

Transformer secondary winding 102 supplies power to winding 35 of motor 34 through a circuit which may be traced from the lower terminal of winding 102 through a conductor 114, a condenser 115, a conductor 116, terminal 44, a conductor 117, winding 35, ground connection 40, a ground connection 120, and a conductor 121 to the upper terminal of secondary winding 102.

Secondary winding 103 is connected to terminals 50 and 51, which are connected to input terminals 52 and 53 of bridge 54 through conductors 105 and 106 respectively.

*Operation of Figures 1 and 2*

When the parts are in the positions shown in the drawings, both sets of dampers 30 are half open, and the slider 72 is at the mid-point of slide wire 71. Let it be assumed that the bridge 54 is balanced, and that the adjustable resistance 80 has been set so that the bridge remains balanced when the temperature in the cabin 11 is 70°.

When the bridge circuit 54 is balanced, the output terminals 66 and 67 are at the same potential, so that no signal is applied to the input terminals of amplifier 90. Under these conditions, no alternating current flows through winding 36 of motor 34. Although winding 35 of motor 34 is continuously energized by its connections to transformer secondary 102, both windings 35 and 36 must be energized with currents of the proper phase relationship in order to cause rotation of motor 34, in accordance with the well known characteristics of split phase motors. Condenser 115 is connected in series with motor winding 35 in order to shift the phase of the current supplied to that winding approximately 90 electrical degrees with respect to the potential and the terminals of transformer secondary winding 102.

When the bridge circuit 54 is balanced, the output terminals 66 and 67 are at the same potential, which is at some value intermediate the potentials of input terminals 52 and 53. If, after the bridge is balanced, the resistance of element 55 decreases, the potential of output terminal 66 assumes a new value closer to that of input terminal 52. Since the output terminal 67 retains its original potential value, it will be seen that there is a potential difference between output terminals 66 and 67. As between the two output terminals, the potential of output terminal 66 is closer to that of input terminal 52, while the potential of output terminal 67 is closer to that of input terminal 53. Therefore, the unbalance potential appearing between output terminals 66 and 67 is in phase with the potential supplied to input terminals 52 and 53.

On the other hand, if the resistance of element 55 increases after the bridge is balanced, the potential of output terminal 66 assumes a value closer to that of input terminal 53. The output terminal 67 retains its original potential value, and therefore a potential difference appears between output terminals 66 and 67. In this case, however, as between the two output terminals, the potential of terminal 66 is closer to that of input terminal 53, while the potential of terminal 67 is closer to that of input terminal 52. Therefore, it may be seen that the unbalance potential appearing between output terminals 66 and 67 is opposite in phase to that supplied to input terminals 52 and 53.

Consider now the effects upon the balance of the bridge circuit of changes in the resistance of elements 60 and 63. If, after the bridge is balanced, the resistance of either element 60 or 63 decreases, the output terminal 67 thereby assumes a potential closer to that of input terminal 53. The potential of output terminal 66 retains its original value, so that, as between the two output terminals, the potential of terminal 66 is closer to that of input terminal 52, while the potential of terminal 67 is closer to that of output terminal 53. Therefore, the unbalance potential appearing between output terminals 66 and 67 is in phase with the potential supplied to input terminals 52 and 53.

On the other hand, if the resistance of either element 60 or 63 increases after the bridge is balanced, the output terminal 67 thereby assumes a potential closer to that of input terminal 52.

The potential of output terminal 66 retains its original value, so that, as between the two output terminals, the potential of terminal 66 is closer to that of input terminals 53, while that of terminal 67 is closer to that of input terminal 52. Therefore, the unbalance potential appearing between output terminals 66 and 67 is opposite in phase to that supplied to input terminals 52 and 53.

Recapitulating, it will be seen that a decrease in the resistance of any of the elements 55, 60 or 63 will cause an alternating potential to appear at output terminals 66 and 67, which is in phase with the potential supplied to input terminals 52 and 53. On the other hand, an increase in resistance of any of the elements 55, 60 or 63 will cause an alternating potential to appear at output terminals 66 and 67 which is opposite in phase to that of the potential supplied to input terminals 52 and 53.

A rise in temperature either in the intake duct 20 adjacent resistance element 63, in the discharge duct 28 adjacent the resistance element 60, or in the cabin 11 itself adjacent resistance element 55 indicates that less heat is necessary to maintain the cabin 11 at the desired temperature. When such a rise in one of the three temperatures referred to occurs, the resistance of the corresponding one of the temperature responsive elements 55, 60 and 63 increases, thereby unbalancing the bridge circuit 54 in such a direction that an alternating potential appears at output terminals 66 and 67 having a phase opposite to that of the potential supplied to terminals 52 and 53. On the other hand, when a decrease in any of these temperatures occurs, a need for the supply of additional heat to the cabin 11 is indicated, and the bridge is unbalanced in such a direction that a potential appears between terminals 66 and 67 having the same phase as the power supplied to input terminals 52 and 53.

Two possible circuits may be traced through the motor field winding 36. One of these circuits extends from the upper terminal of secondary 101 through conductor 110, terminal 91, anode 90b, cathode 91a, conductor 97, ground connections 93 and 40, field winding 36, conductor 113, terminal 45 and conductor 112 to the center tap of secondary 101. The other circuit extends from the lower terminal of secondary 101 through conductor 111, terminal 92, anode 90c, cathode 91a, conductor 97, ground connections 93 and 40, field winding 36, conductor 113, terminal 45, and conductor 112 to the center tap of secondary 101. Current will flow through the first traced circuit only during the half cycle in which the anode 90b is positive with respect to the cathode. This will occur only during the half cycle when the upper end of the secondary 101 is positive with respect to the lower. Current will flow through the last mentioned circuit, on the other hand, only when anode 90c is positive with respect to the cathode and hence the lower end of secondary 101 is positive with respect to the upper end. Thus it is possible only during alternating half cycles for current to flow through the respective circuits traced. It is furthermore possible for current to flow through either one of these current paths only when the effect of the amplifier signal potential as applied to the grid is to tend to raise the potential of the grid during the half cycle in which the anode is positive. Since, as was previously noted, the grids 92b and 92c are connected together, it will be readily apparent that the voltages applied to these two grids are identical and hence in phase with each other. The voltages applied to the two anodes 90b and 90c are out of phase with each other. As a result, the amplifier signal voltage applied to the grids 92b and 92c will be in phase with the anode voltage applied to either one or the other of the two anodes so that current will flow through one or the other of the two paths traced. The phase of the signal voltage is dependent upon the phase of the output voltage of the bridge which, as previously explained, is dependent upon the direction in which the bridge is unbalanced. Thus, one or the other of the two circuits traced is rendered effective depending upon the unbalance of the bridge. Since the voltages applied to these two circuits are 180° displaced in phase with respect to each other, it will be obvious that the current flowing through winding 36 when the bridge is unbalanced in one direction will be 180° displaced with respect to that flowing through the same winding when the bridge is unbalanced in the opposite direction. Since the output voltage of secondary 101 is in phase with the output voltage of secondary 103 which supplies the input voltage to the bridge, it will be readily apparent that the current flowing in winding 36 will be of the same or opposite phase as the terminal voltage of the secondary winding 102.

Since the current flowing in winding 36 is of the same or opposite phase as the terminal voltage of the transformer secondary winding, while the current flowing in winding 35 is shifted 90 degrees in phase in respect to the terminal voltage of the transformer secondary winding, motor 34 will be driven in one direction or the other depending upon whether the current in winding 36 is of the same or the opposite phase as that of the secondary terminal voltage.

The connections between the bridge circuit 54 and the amplifier 90, and between amplifier 90 and motor 34, are such that when the bridge is unbalanced in a direction indicating the need for less heat in the cabin 11, motor 36 is driven in a direction to close the dampers in the heater duct 23 and open the dampers in the by-pass duct 22, thereby supplying less heat to the cabin 11. This operation of motor 34 also drives slider 72 to the right along slide wire 71, thereby rebalancing the bridge circuit 54.

When the temperature adjacent either of the three temperature controlling resistance elements 55, 60 and 63 decreases, the bridge is unbalanced in such a direction that amplifier 90 responds to drive motor 34 so as to close the dampers in by-pass duct 22 and open the dampers in heater duct 23, thereby supplying more heat to the cabin 11. This is done by driving lever arm 31 and slider 72 to the left. Motion of slider 72 to the left rebalances the bridge circuit so as to stop the motor 34.

It should be noted that in the amplifier and power unit 41, the only wound coils or electromagnetic devices using iron cores are those associated with inverter 94, transformer 96, and motor 34. The weight of the amplifier and power unit has thereby been maintained at a minimum. Furthermore, there are no switch contacts in the entire system, except those associated with inverter 94, which may be readily shielded so as to produce no radio interference.

*Figure 3*

In Figure 3 is disclosed an aircraft cabin temperature control system in which the control is accomplished by modulating the fuel supply to a fluid fuel burning heater arrangement. In this figure, all parts of the system which correspond exactly to similar parts in Figure 1 have been given the identical reference numerals. It will be noted that the bridge circuit 54, the amplifier and power unit 41, the motor mechanism 33, are the same as in Figure 1. Furthermore, the location of the temperature responsive resistance 63 in the intake duct 20, the location of temperature responsive resistance 60 in the discharge duct 28, and the location of temperature responsive resistance 55 in the cabin 11 are the same as the location of the corresponding elements in Figure 1.

In Figure 3, the air supplied to the cabin 11 passes through the intake duct 20, over a plurality of fluid fuel burning heaters 120, and through the discharge duct 28 to the cabin 11. Fuel is supplied to the heaters 120 through a fuel supply pipe 121. The supply of fuel to the heaters 120 is controlled by a modulating valve 122, and by a shut-off valve 123. Any suitable source of fluid fuel may be used. For example, in certain installations, the fuel has been a combustible mixture of gasoline and air drawn from the intake manifold of one of the aircraft engines.

The modulating valve 122 is operated by the motor mechanism 33. The valve 122 has an opening 124 in the center thereof to insure that it never fully closes, but always permits a minimum flow of fuel therethrough.

The shut off valve 123 is provided with an electrical operator 125, which may be a solenoid or a rotatory motor, for example. Each of the heaters 120 is provided with a suitable ignition mechanism such as the hot wire igniter shown somewhat diagrammatically at 126. Energization of valve operator 125 and the igniters 126 is controlled by a switch 127 comprising a stationary contact 130 and a movable switch arm 131. The switch arm 131 carries a follower 132 of insulating material, cooperating with a cam 133 driven by the motor mechanism 33.

*Operation of Figure 3*

For purposes of clarity, the modulating valve 122 has been shown in Figure 3 in its fully open position. The slider 72 of rebalancing potentiometer 70 is shown at its corresponding position at the upper extremity of slide wire 71. Likewise, the cam 133 is shown in a position wherein it has closed switch 127, thereby completing energizing circuits for shut-off valve operator 125 and igniters 126.

The energizing circuit for operator 125 may be traced from the upper terminal of battery 46 through a conductor 134, switch 127, a conductor 135, a conductor 136, operator 125, and ground connections 137 and 138 to the lower terminal of battery 46. The energizing circuit for igniters 146 may be traced from the upper terminal of battery 46 through conductor 134, switch 127, conductors 135 and 140, and a plurality of parallel conductors 141 to the respective igniters 126, only one of which is shown, the frame of burners 120, supply pipe 121, and ground connections 142 and 138 to the lower or grounded terminal of battery 46.

The construction of operator 125 is such that when energized it maintains valve 123 in open position. Therefore, when the parts are in the position shown in the drawings, a maximum supply of fuel to the burners 120 is maintained, and the fuel is ignited by the igniters 126.

As in Figure 1 the motor mechanism 33 modulated the position of the damper 30 in response to temperature changes, so in Figure 3 the motor mechanism 33 modulates the position of the valve 122. It is believed that this operation of valve 122 by motor mechanism 33 will be readily understood from what has gone before, and need not be further described.

As the valve 122 moves towards its closed position from the position shown, the cam 133 is rotated in a counter-clockwise direction. The construction is such that when the valve 122 reaches its minimum position, the follower 132 of switch arm 131 has nearly reached the end of the high dwell portion of cam 133. If the bridge circuit 54 then becomes unbalanced so as to indicate a need for further reduction in the supply of fuel to the heaters 120, cam 133 rotates a slight additional amount in a counter-clockwise direction. This moves the high dwell portion out from under follower 132, allowing it to drop to the low dwell portion, thereby opening switch 127. Opening of switch 127 shuts out the supply of electrical energy to the operator 125 and to the igniters 126. Deenergization of operator 125 causes shut off valve 123 to close.

It should therefore be apparent that the supply of fuel to the heaters 120 is modulated from a maximum to a minimum value and that if a further reduction in the supply of fuel is necessary, the supply is cut off completely and the igniters are deenergized. In heaters using highly combustible fuels of the type described, it is necessary that a minimum supply of fuel be maintained in order to prevent a flash back, a phenomenon in which the flame moves back along the fuel supply pipe to the source of fuel. This minimum supply is maintained by the system shown, until the system is completely shut down.

*Figure 4*

In Figure 4 is shown an engine temperature control system embodying my invention. An aircraft engine 150, of the air cooled type, is provided for driving a propeller 151. The engine 150 has a cowl 152, of conventional form. Air for cooling the engine 150 flows through an opening at the front of the engine, which is not shown in detail in the drawings, but whose general location is shown at 153. After passing over the engine, the heated air passes out through flap 154 in the cowl 152.

A temperature responsive device 155 is mounted on the engine 150. It may, for example, be conveniently attached to a spark plug 159. Resistance element 155 is connected in a bridge circuit generally indicated at 156, having input terminals 157 and 158, and output terminals 160 and 161.

Input terminals 157 and 158 are connected through conductors 162 and 163 into terminals 50 and 51 respectively of an amplifier and power unit 41, similar to the corresponding amplifier and power unit shown in Figures 1, 2, 3. Output terminal 160 of bridge 156 is connected through a conductor 164 to input terminal 42 of amplifier and power unit 41. Output terminal 161 of bridge 156 is grounded at 165, and is therefore connected through ground connections 165 and 93 to input terminal 43 of amplifier and power unit 41.

The upper left hand arm of bridge circuit 156 connects input terminal 157 with output terminal 160, and includes a conductor 166, resistance element 155, conductors 167 and 168, and that portion of a slide wire resistance 170, between its left hand terminal and its cooperating slider 171.

which is electrically connected to output terminal 160. Slide wire 170 and slider 171 constitute a rebalancing potentiometer 172, hereinafter referred to as the ultimate rebalancing potentiometer.

The upper right arm of bridge circuit 156 connects output terminal 160 and input terminal 158, and includes that portion of slide wire 170 between slider 171 and its right hand terminal, a conductor 173, and a fixed resistance 174. An adjustable resistance 175 is connected in parallel with slide wire 170 in order to determine the amount of movement of slider 171 necessary to correct a given unbalance of the bridge circuit 156.

The lower left arm of bridge circuit 156 connects input terminal 157 with output terminal 161, and includes a conductor 176, a fixed resistance 177, and that part of a slide wire resistance 180 between its left hand terminal and its cooperating slider 181. Slide wire 180 and slider 181 form a rebalancing potentiometer hereinafter referred to as the proximate rebalancing potentiometer.

The lower right arm of bridge circuit 156 connects output terminal 161 with input terminal 158 and includes that portion of slide wire 180 between slider 181 and its right hand terminal, a conductor 183, a fixed resistance 184, and a variable resistance 185. The variable resistance 185 is provided in order to adjust the temperature at which the control system maintains the engine 150. A variable resistance 186 is connected in parallel with slide wire 180 in order to determine the amount of movement of slider 181 necessary to correct a given unbalance of bridge 156.

Motor mechanism 33, which is controlled in response to the unbalance potential of bridge 156 acting through amplifier and power unit 41, drives, through a gear mechanism schematically indicated at 187, a shaft 188 connected to slider 181, and a shaft 190 which carries a series of cams 191, 192, 193 and 194.

The cams 191, 192, 193 and 194 operate a series of four poppet valves 195, 196, 197 and 198, respectively. These poppet valves control the flow of high pressure fluid to a hydraulic servo motor 200, of conventional design.

A suitable source of high pressure fluid is provided for operating servo motor 200, this source being shown in the drawing as a pump and high pressure chamber associated therewith and numbered 201. High pressure fluid may flow from the high pressure chamber 201 through a suitable conduit 202 to an inlet chamber 203 in a valve casing 204, which contains the poppet valves 195, 196, 197 and 198. Valves 196 and 197 control the flow of high pressure fluid from inlet chamber 203 to valve chambers 205 and 206, respectively. Valves 195 and 198 control the flow of fluid from valve chambers 205 and 206 to outlet chambers 207 and 208, respectively. Outlet chambers 207 and 208 are connected by conduits 209 and 210 respectively, to a sump or receiver of low pressure fluid 211.

The servo motor 200 comprises a cylinder 212 having a piston 213 reciprocatable therein. One end of the cylinder 212 is connected through a conduit 214 to the valve chamber 206, and the other end of the cylinder 212 is connected through a conduit 215 to the valve chamber 205.

A piston rod 216 is attached to the piston 213 and passes through a suitable gland, not shown, in the end of cylinder 212, and through a bearing 217, of any suitable construction, which may be attached to a fixed part of the aircraft. Pivotally attached to the piston rod 216, as at 220, are a pair of links 221, whose opposite ends are pivotally attached to the cowl flaps 154. Another link 223 is attached at one end to an intermediate point on link 221 and at its opposite end to the slider 171. Either some portion of link 222 or a suitable part of its pivotal connection with slider 171 may be made of insulating material in order to prevent grounding of the slider 171.

Operation of Figure 4

When the parts are in the position shown in the drawing, the flaps 154 are half-way open, and the piston 213 is in a central position in the cylinder 212. The bridge circuit 156 is balanced, the sliders 171 and 181 are in their center positions, and all the valves 191, 192, 193 and 194 are closed. Under these conditions, let is be assumed that the temperature of the engine 150 increases, thereby increasing the resistance of sensitive element 155, thus increasing the resistance between input terminal 157 and output terminal 171 of bridge 156. This unbalance of bridge circuit 156 causes a signal to be impressed on the amplifier and power unit 41, which in turn transmits a control impulse to the motor mechanism 33. The connections are so arranged that the control impulse transmitted to motor 33 is in the proper direction to cause it to rotate shaft 190 in a clockwise direction, and also to rotate shaft 188 in a clockwise direction. Rotation of shaft 188 clockwise causes movement of slider 181 to the right along slide wire 180, thereby producing an increase in the resistance between input terminal 157 and output terminal 161 to balance the increase between input terminal 157 and output terminal 160 caused by the increase in engine temperature. This rebalancing of the bridge circuit 156 causes motor 33 to stop substantially as soon as the valves are opened.

Rotation of shaft 190 in a clockwise direction causes opening of valves 195 and 197 under the influence of cams 191 and 193. Valves 196 and 198 remain closed. High pressure fluid is then admitted to the right hand end of cylinder 212 from inlet chamber 203 through valve 197, valve chamber 206, and conduit 214. At the same time, the pressure on the fluid in the left hand end of cylinder 212 is released through conduit 215, valve chamber 205, valve 195, and outlet chamber 207. Therefore a pressure differential is established between the opposite faces of piston 213, thereby forcing it to the left from the position shown in the drawings. Movement of piston 213 and its associated piston rod 216 to the left causes the links 221 and 222 to push the cowl flaps 154 further open, thereby causing an increased flow of air over engine 150 to provide additional cooling thereof, so as to tend to restore its temperature to the value previously determined by the setting of resistance 185.

Movement of piston rod 216 to the left is also transmitted through links 221 and 223 to the slider 171. Movement of slider 171 to the left causes a decrease in the resistance between input terminal 157 and output terminal 160. This causes an unbalance of bridge circuit 156 in the opposite direction from that caused by the previous unbalance, so that a control impulse is transmitted to motor mechanism 33 causing it to rotate shafts 188 and 190 in a counter-clockwise direction. Rotation of shaft 188 counter-clockwise causes slider 181 to be driven to the left across slide wire 180, thereby rebalancing the bridge circuit, while rotation of shaft 190 in a counter-clockwise direction causes closure of valves 191 and 193, thereby stopping operation of servo motor 200.

The resistance of slide wire 180 is made much smaller than the resistance of slide wire 170. Because of this, the effect of potentiometer 172 on the balance of the bridge circuit 156 is greater than the effect of potentiometer 182. In other words, if the slider 171 moves through a given portion of its range of travel, the slider 181 must move through a greater portion of its range in order to rebalance the bridge circuit 156. Therefore, a small movement of slider 171 in response to opening of the valves 191 and 193, for example, is sufficient to cause movement of slider 181 corresponding to the full closing movement of the valves.

The relative effects of sliders 171 and 181 on the balance of the bridge, and hence the amount of movement of slider 171 required to cause closure of the valves, may be regulated by adjusting the variable resistances 175 and 186.

By proportioning the relative effects of potentiometers 172 and 182 in the manner described, full opening and closure of the valves may be controlled by very small unbalancing effects in the bridge circuit. Full power is thereby made available for control purposes even through the correction required is small.

It should be apparent that the rebalancing action of the proximate rebalancing potentiometer 182 is only temporary, and that the slider 181 always finally comes to rest at or near its center position. The ultimate rebalancing of the bridge circuit following an unbalance thereof is accomplished by the slider 171 in accordance with the new position of cowl flaps 154. When the bridge 156 is ultimately balanced the slider 181 is always in or near its center position and all the valves 191, 192, 193, and 194 are closed.

When the temperature of the sensitive resistance element 155 drops below the value which maintains the bridge circuit 156 balanced, a signal of the opposite phase is applied to the amplifier and power unit 41, thereby causing rotation of motor mechanism 33 in the opposite direction so as to rotate shafts 188 and 190 in a counter-clockwise direction, thereby moving slider 181 to the left and opening valves 192 and 194. It will be readily understood that this causes movement of piston 213 to the right, thereby moving slider 171 to the right and causing slider 181 to be returned to its center position as the valves 192 and 194 are closed by rotation of motor 33.

It should be apparent from the shape of cams 191, 192, 193 and 194 that this system has a considerable "dead spot." In other words, there is a considerable angle through which the shaft 190 may rotate without actuating any of the valves 195, 196, 197 and 198. There is of course a corresponding range of movement of slider 181 on either side of its center position in which the bridge circuit may be balanced by the movements of this slider without causing movements of the slider 171. Since it is permissible to allow the engine temperature to vary about the desired value by a considerable range, for example 10 or 15°, this construction of the cam permits the slider 181 to take care of minor variations in temperature without causing unnecessary control operations of the servo motor 200. The relatively wide "dead spot" also permits either slider 171 or 181 to overrun its exact rebalancing position to a certain extent without causing the system to "hunt."

*Figure 5*

There is shown in Figure 5 a modified form of hydraulic servo motor which may be used in the system disclosed in Figure 4, and when used therein results in a substantially different mode of operation of the system. The servo motor 225 of Fig. 5 comprises a cylinder 226 and a loosely fitting piston 227 reciprocable therein. The other parts are the same as in Figure 4, as indicated by their reference characters. It will be understood that a tightly fitting piston with a leak port or any similar arrangement might be used, so long as there is a small leak between the ends of the cylinder. The size of the leak as it appears in Figure 5 has been exaggerated for the sake of clarity. In practice, a very small orifice between the ends of the cylinder would be sufficient.

When servo motor 225 is used in the system of Figure 4, the system is completely stable only when the piston 227 is at a position determined by the bias of the load on it. In the present case, the flaps 154, due to the balance between the outside and inside air pressures acting on them, always tend to return to a central position, which is approximately the position shown in the drawings. The load on the servo motor may therefore be said to bias it for movement to its center position. When the servo motor 225 is used in the system of Figure 4, and the bridge is balanced, the piston 227 therefore moves slowly toward its center position, the movement being controlled by the flow of fluid through the leak or orifice between the ends of the cylinder 226. Therefore the slider 171 also moves slowly to its center position. During this movement the bridge circuit is maintained in balance by the rebalancing action of slider 181, driven by motor 33.

When the rebalancing action required of slider 181 carries it to a point where one pair of valves begins to open, the servo motor piston 227 is given an impulse in the opposite direction away from its center position. This of course causes slider 171 also to move away from its center position and unbalances the bridge in the opposite direction so that motor mechanism 33 again closes the valves which were opened. The net result is that the position of piston 227 tends to slowly oscillate about a point such that the balance of the bridge is maintained with the slider 181 at one end or the other of its "dead spot." The piston 213 moves toward its center position just far enough to unbalance the bridge so as to cause one set of poppet valves to open slightly, whereupon the piston is given an impulse in the opposite direction by the high pressure fluid, thereby unbalancing the bridge in the opposite direction and causing closure of the poppet valves. This action is cyclically repeated.

When the system is operating under these conditions, a slow variation in the temperature of the engine 150 will cause a change in the median position about which the piston 227 oscillates. The slider 181 will continue to oscillate about the same end of its dead spot, thereby causing operation of the same set of valves as long as the rate of change of resistance 155 is lower than the rate of change of resistance 172 to the movement of slider 171. When the temperature of engine 150 changes rapidly however, resistance 155 also changes rapidly, causing a greater movement of slider 181 to open the valves fully. If the change is in the opposite direction, the slider will be moved clear across its dead spot and will open the opposite set of valves to produce the required control effect on the cowl flaps 154.

It should be understood that this type of control is not limited to the system described herein, but may be applied to other control systems. In a system where a rapid response is not required under certain conditions, one set of poppet valves could be dispensed with, and the system allowed to oscillate under the control of a single set of poppet valves.

*Figure 6*

In Figure 6 is shown an aircraft engine temperature control system utilizing a modified embodiment of my invention. Figure 6 shows a system for controlling the temperature of an air cooled engine 150 by modulating the position of the cowl flaps 154 in a manner generally similar to that disclosed in Figure 4. The system shown in Figure 6 utilizes a temperature responsive resistance element 155 which may be the same as that used in Fig. 4. A different type of bridge circuit is used however, and a somewhat different amplifier and motor control system is also used, the system being completely electrical, rather than partly electrical and partly hydraulic as in Fig. 4.

Temperature responsive resistance element 155 is connected in a bridge circuit 250 having input terminals 251 and 252 and output terminals 253 and 254. The upper left arm of bridge circuit 250 connects input terminals 251 with output terminal 253 and includes temperature responsive resistance element 155. The upper right arm of bridge circuit 250 connects output terminal 253 and input terminal 252, and includes a fixed resistance 255. The lower left arm of bridge circuit 250 connects input terminal 251 and output terminal 254, and includes a fixed resistance 256, a conductor 257, and that part of a slide wire resistance 258 between its left hand terminal and its cooperating slider 259. Slide wire 258 and slider 259 constitute a rebalancing potentiometer for the bridge circuit 250.

The lower right arm of bridge circuit 250 connects output terminal 254 with input terminal 252 and includes that part of slide wire 258 between the slider 259 and its right hand terminal, the conductor 261, and an adjustable resistance 262. The function of resistance 262 is to determine the control point of the system, in other words, it determines that temperature adjacent to resistance 155 which causes the bridge to be balanced when the rebalancing potentiometer 260 is in a given position. A variable resistance 263 is connected in parallel with the slide wire 258. The function of resistance 263 is to determine the amount of movement of slider 259 necessary to connect a given unbalance of the bridge 250.

Output terminal 253 is connected to an input terminal 265 of an electronic amplifier 266. Amplifier 266 may be of any desired type, but I prefer to use one of the type disclosed in Figure 2 of the copending application of Albert P. Upton, Serial No. 437,561, dated April 3, 1942. Output terminal 254 of bridge circuit 250 is connected to ground at 267, and through ground connections 268 to input terminal 270 of amplifier 266.

Amplifier 266 has a pair of power supply terminals 271 and 272, and a pair of selectively energizable output terminals 273 and 274. Input terminal 270, serves, through ground connection 268 as a common return terminal for the output terminals 273 and 274.

Output terminal 273 is connected through a conductor 275, winding 276 of relay 277, a conductor 278, transformer secondary winding 280, and a conductor 281 to ground at 282.

Output terminal 274 is connected through a conductor 283, coil 284 of a relay 285, a conductor 286, the lower half of transformer secondary winding 280, and conductor 281 to ground at 282.

Secondary winding 280 forms a part of a transformer 287 having a primary winding 288 and additional secondary windings 289 and 290. Secondary winding 289 is connected through conductors 299 and 291, respectively to input terminals 251 and 252 of bridge circuit 250. The secondary winding 290 is connected through conductors 293 and 294 to power supply terminals 271 and 272 of amplier 266.

Primary winding 288 is supplied with alternating current by means of an inverter 295 of any well known type, which is in turn supplied with direct current from a battery 296 through conductor 297 and 298.

Relay 277 includes a switch arm 300 movable into engagement with a stationary contact 301 upon energization of coil 276. Relay 285 includes a switch arm 302 movable into engagement with a stationary contact 303 upon energization of coil 284.

The switches 300 and 302 control the energization of a reversible direct current motor generally indicated at 304, comprising an armature 305 and a pair of field windings 306 and 307. The field windings 306 and 307 are so connected with respect to the armature 305 that their selective energization causes rotation of the motor in opposite directions.

Motor 304 drives, through a gear train schematically indicated at 310, a pinion 311, which cooperates with a rack 312 on a thrust rod 313.

The thrust rod 313 is slideable through a bearing 314 of any suitable construction, which may be attached to a fixed part of the air craft. Pivotally attached to the thrust rod 313 are a pair of links 315 and 316, pivotally connected at their opposite ends to cowl flaps 154. A motion reversing link 317 is mounted on a fixed pivot, as at 319, and has one end attached by a suitable connection such as a pin and slot arrangement, to the thrust rod 313. The other end of link 317 is pivotally attached to a link 318, whose opposite end is attached to slider 259.

*Operation of Figure 6*

The amplifier 266 is so constructed that when an alternating signal of a predetermined phase is applied to the input terminals 265 and 270, that branch of the output circuit extending through output terminal 273 and relay 277 is energized. When an alternating current signal of the opposite phase is applied to input terminals 265 and 270, the other branch of the output circuit including terminal 274 and relay 285 is energized. It will therefore be apparent that the relays 277 and 285 are selectively energized in accordance with the direction of unbalance of bridge circuit 250.

With the parts in the positions shown in the drawings, let it be assumed that the temperature adjacent the temperature responsive element 155 increases above the value which it is desired to maintain. This increases the resistance between input terminal 251 and output terminal 253 of bridge circuit 250. This unbalances the bridge 250 in such a direction that an alternating potential is applied to amplifier 266 with the proper phase relationship to cause energization of the relay winding 276. Energization of relay winding 276 causes switch arm 300 to move into engagement with contact 301, thereby completing an energizing circuit for field winding 307 and armature 305 of motor 304. This energizing circuit may be traced from the lower terminal of battery 296 through a conductor 320, switch arm 300, contact 301, a conductor 321, field winding 307, brush 322, armature 305, brush 323, and a conductor 324 to the upper terminal of battery 296.

Energization of winding 307 and armature 305 causes rotation of motor 304 in such a direction as to rotate pinion 311 counter-clockwise, thereby driving thrust rod 313 to the left, and opening cowl flaps 154. Movement of thrust rod 313 to the left also acts through links 317 and 318 to move slider 259 to the right, thereby increasing the ressitance between bridge input terminal 251 and output terminal 254, and balancing the increased resistance between input terminal 251 and output terminal 253 due to the increase in engine temperature. When the bridge is again balanced, the relay 277 is deenergized and motion of the cowl flap 154 and the slider 259 ceases.

If the engine temperature decreases below the value it is desired to maintain, the bridge 250 is unbalanced in the opposite direction, thereby causing energization of winding 284 of relay 285. Energization of relay winding 284 causes switch arm 302 to be closed against stationary contact 303, thereby completing an energizing circuit for winding 306 and armature 305 of motor 304. This circuit may be traced from the lower terminal of battery 296 through conductor 320, switch arm 302, contact 303, a conductor 325, field winding 306, brush 322, armature 305, brush 323, and conductor 324 to the upper terminal of battery 296. Completion of this circuit causes rotation of motor 304 in such a direction as to rotate pinion 311 clockwise thereby driving thrust rod 313 to the right and moving the cowl flaps 154 toward closed position. This movement of thrust rod 313 to the right also drives slider 259 to the left, thereby rebalancing the bridge circuit 250.

While I have shown and described certain specific embodiments of my invention, other modifications thereof will readily occur to those skilled in the art, and I therefore wish to be limited only by the scope of the appended claims.

I claim as my invention:

1. In combination, an aircraft, means defining a space within said aircraft, duct means for supplying air to said space, means for utilizing the motion of said aircraft to induce a flow of air through said duct means, heater means in said duct means, means for controlling the amount of heat transferred by said heater to the air flowing through said duct means, a temperature responsive resistance element, means for mounting said element in a position exposed to the temperature of the air in said space, a second temperature responsive resistance element, means for mounting said second element in said duct means on the up-stream side of said heater means, a normally substantially balanced electrical circuit including both said elements, electronic amplifier means having an input circuit and an output circuit, electrical motor means for operating said control means, an electrical connection between said balanced circuit and said input circuit, and another electrical connection between said output circuit and said motor means.

2. In combination, an aircraft, means defining a space within said aircraft, duct means for supplying air to said space, means for utilizing the motion of the aircraft to induce a flow of air through said duct means, a heater mounted in said duct means including a fluid fuel burner, valve means for modulatingly controlling the supply of fuel to said burner, an element having an appreciable temperature coefficient of resistance, means for mounting said element in a position exposed to the temperature of the air in said space, a normally substantially balanced electrical network including said element, an electronic amplifier having an input circuit and an output circuit, means for rebalancing said network, electrical motor means for operating said valve means and said rebalancing means simultaneously, a continuously conductive electrical connection between said network and said input circuit, and another continuously conductive electrical connection between said output circuit and said motor means.

3. A system for controlling the temperature of an aircraft engine, comprising in combination, means for cooling said engine, an element having an appreciable temperature coefficient of resistance, means for mounting said element in proximity to a part of said engine, an electronic amplifier having an input circuit and an output circuit, electrical motor means for controlling said cooling means, a connection between said element and said input circuit, and a connection between said output circuit and said motor means.

4. A system for controlling the temperature of an aircraft engine, comprising in combination, means for cooling said engine, hydraulic means for operating said cooling means, an element having an appreciable temperature coefficient of resistance, means for mounting said element in proximity to a part of said engine, an electronic amplifier having an input circuit and an output circuit, electrical motor means for controlling said hydraulic means, a connection between said element and said input circuit, and a connection between said output circuit and said motor means.

5. A system for controlling a fluid operated servo-motor, comprising in combination, means for supplying fluid under pressure, valve means controlling the flow of fluid from said supply means to said servo-motor, a device having an electrical characteristic variable in accordance with a condition indicative of the need for operation of said servo-motor, a normally balanced electrical network including said device, said device being operative upon a change in said condition to unbalance said network, means operated by said servo-motor for rebalancing said network, an electronic amplifier having an input circuit and an output circuit, means connecting said device and said input circuit, electric motor means for operating said valve means, and means connecting said electric motor means and said output circuit.

6. A system for controlling a fluid operated servo-motor, comprising in combination, means for supplying fluid under pressure, valve means controlling the flow of fluid from said supply means to said servo-motor, a device having an electrical characteristic variable in accordance with a condition indicative of the need for operation of said servo-motor, a normally balanced electrical network including said device, said device being operative upon a change in said condition to unbalance said network, an electronic amplifier having an input circuit and an output circuit, means connecting said device and said input circuit, electric motor means for operating said valve means, means connecting said electric motor means and said output circuit, means operated by said electrical motor means for changing the balance condition of said network, and additional means operated by said servo-motor for changing the balance condition of said network.

7. A control system, comprising in combination, a pressure operated reversible fluid motor, means for supplying fluid under pressure, at least two selectively operable valve means for controlling the flow of fluid from said supply means to said fluid motor so as to cause operation thereof selectively in either direction, reversible electrical motor means for operating said valve means, said electrical motor means having a normal position wherein all of said valve means are closed, and being operable in opposite directions from said position to selectively open said valve means, a device having an electrical characteristic variable in accordance with a condition indicative of the need for operation of said fluid motor, a normally balanced electrical network including said device, said device being operative upon a change in said condition to unbalance said network, means responsive to unbalance of said network to energize said electrical motor means for operation in a direction corresponding to the direction of said unbalance, thereby opening one of said valve means, means driven by said electrical motor means to rebalance said network, and means driven by said fluid motor to unbalance said network in the opposite sense, thereby energizing said motor for operation in a direction to close said one valve means and again rebalance said network.

8. A control system, comprising in combination, a load device biased to a predetermined position, a pressure operated fluid motor for driving said load device in opposite directions, means for supplying fluid under pressure, a pair of valve means for controlling the flow of fluid from said supply means to said fluid motor so as to cause operation thereof selectively in either direction, leak means in said motor for permitting slow operation of said motor under the influence of said biased load device when both said valve means are closed, reversible electrical motor means for operating said valve means, said electrical motor means having a normal position wherein both of said valve means are closed, and being operable in opposite directions from said position to selectively open said valve means, a device having an electrical characteristic variable in accordance with a condition indicative of the need for operation of said fluid motor, a normally balanced electrical network including said device, said device being operative upon a change in said condition to unbalance said network, means responsive to unbalance of said network to energize said electrical motor means for operation in a direction corresponding to the direction of said unbalance, thereby opening one of said valve means, means driven by said electrical motor means to rebalance said network, and means driven by said fluid motor to change the balance condition of said network in the same sense as said rebalancing means, so as to cause reversal of said electrical motor.

9. A control system, comprising in combination, a load device biased to a predetermined position, a pressure operated fluid motor for driving said load against its bias, means for supplying fluid under pressure, valve means for controlling the flow of fluid from said supply means to said fluid motor, leak means in said motor for permitting slow operation of said motor under the influence of said biased load device when said valve means is closed, a device having an electrical characteristic variable in accordance with a condition indicative of the need for operation of said load device, a normally balanced electrical network including said device, said device being operative upon a change in said condition to unbalance said network, means driven by said fluid motor for changing the balance condition of said network, and means responsive to the balance or unbalance of said network for operating said valve means.

10. A control system, comprising in combination, a load device biased to a predetermined position, a pressure operated fluid motor for driving said load against its bias, means for supplying fluid under pressure, valve means for controlling the flow of fluid from said supply means to said fluid motor, leak means in said motor for permitting slow operation of said motor under the influence of said biased load device when said valve means is closed, a device having an electrical characteristic variable in accordance with a condition indicative of the need for operation of said load device, a normally balanced electrical network including said device, said device being operative upon a change in said condition to unbalance said network, means driven by said fluid motor for changing the balance condition of said network, second valve means for controlling the flow of fluid to said motor, said second valve means when open, permitting the flow of fluid to said motor so as to drive said load rapidly in the direction of its bias, and means responsive to the balance condition of said network for operating said valve means, said balance responsive means opening said first valve means upon an unbalance of said network in a direction indicative of a need for movement of said load against its bias, and opening said second valve means only upon a relatively large unbalance of said network in a direction indicative of a need for movement of said load in the direction of its bias.

11. In combination, an aircraft, means defining a space within said aircraft, duct means for supplying air to said space, means for utilizing the motion of said aircraft to induce a flow of air through said duct means, heater means in said duct means, means for controlling the amount of heat transferred by said heater to the air flowing through said duct means, a first temperature responsive resistance element, means for mounting said element in a position exposed to the temperature of the air in said space, a second temperature responsive resistance element, means for mounting said second element in said duct means on the up-stream side of said heater means, a third temperature responsive resistance element, means for mounting said third element in said duct means in the path of air discharged from said heater means, said first element having a resistance at least ten times that of each of said second and third elements, a bridge circuit including all said elements in such a manner that a change in any of the elements in a certain sense unbalances the bridge circuit in the same sense, and means responsive to unbalance of said bridge circuit to operate said heat transfer controlling means.

12. In combination, an aircraft, means defining a space within said aircraft, duct means for supplying air to said space, means for utilizing the motion of said aircraft to induce a flow of air through said duct means, heater means in said duct means, means for controlling the amount of heat transferred by said heater to the air flowing through said duct means, a first temperature responsive resistance element, means for mounting said element in a position exposed to the temperature of the air in said space, a second temperature responsive resistance element, means for mounting said second element in said duct means on the up-stream side of said heater means, a third temperature responsive resistance element, means for mounting said third element in said duct means in the path of air discharged from said heater means, said first element having a resistance at least ten times and not more than fifty times that of each of said second and third elements, a bridge circuit including all said elements in such a manner that a change in any of the elements in a certain sense unbalances the bridge circuit in the same sense, and means responsive to unbalance of said bridge circuit to operate said heater controlling means.

13. Electrical temperature control apparatus for an aircraft, comprising in combination, heat producing means on said aircraft, means for utilizing the flow of air caused by the motion of said aircraft to conduct air into heat exchange relation with said heat producing means, means for controlling the amount of heat transferred from said heat producing means to said air, reversible electrical motor means for operating said heat transfer control means, an electrical resistance element having an appreciable temperature coefficient of resistance and exposed to a temperature indicative of the need for operation of said heat transfer control means, means including said element for producing an alternating electrical signal of a phase dependent upon the direction in which said heat transfer control means needs to be operated, amplifier means for controlling the direction of operation of said motor means in accordance with the phase of said signal, said amplifier means having an input circuit and an output circuit, means coupling said signal producing means and said input circuit, means coupling said output circuit and said motor means, and means for supplying said signal producing means, said amplifier means and said motor means with alternating electrical energy of fixed frequency and predetermined phase relationships, said energy supplying means comprising a transformer having a primary winding and at least three secondary windings, means connecting one of said secondary windings to said signal producing means, means connecting a second of said secondary windings to said amplifier means, means connecting a third of said secondary windings and said motor means, and means including a battery and an inverter for supplying said primary winding with alternating electrical energy.

14. Electrical temperature control apparatus for an aircraft, comprising in combination, a heater on said aircraft, means for utilizing the flow of air caused by the motion of said aircraft to conduct air into heat exchange relation with said heater to warm said air, means for controlling the amount of heat transferred from said heat producing means to said air, reversible electrical motor means for operating said heat transfer control means, an electrical resistance element having an appreciable temperature coefficient of resistance and exposed to the temperature of the air warmed by said heater, means including said element for producing an alternating electrical signal of a phase dependent upon the direction in which said heat transfer control means needs to be operated, amplifier means for controlling the direction of operation of said motor means in accordance with the phase of said signal, said amplifier means having an input circuit and an output circuit, means coupling said signal producing means and said input circuit, means coupling said output circuit and said motor means, and means for supplying said signal producing means, said amplifier means, and said motor means with alternating electrical energy of fixed frequency and predetermined phase relationships, said energy supplying means comprising a transformer having a primary winding and at least three secondary windings, means connecting one of said secondary windings to said signal producing means, means connecting a second of said secondary windings to said amplifier means, means connecting a third of said secondary windings and said motor means, and means including a battery and an inverter for supplying said primary winding with alternating electrical energy.

15. Electrical temperature control apparatus for an aircraft, comprising in combination, an engine on said aircraft, means for utilizing the flow of air caused by the motion of said aircraft to conduct air into heat exchange relation with said engine to cool said engine, damper means for controlling the flow of air into heat exchange relation with said engine, reversible electrical motor means for operating said damper means, an electrical resistance element having an appreciable temperature coefficient of resistance and exposed to the temperature of said engine, means including said element for producing an alternating electrical signal of a phase dependent upon the direction in which said damper means needs to be operated to maintain the temperature of said engine within a predetermined range, amplifier means for controlling the direction of operation of said motor means in accordance with the phase of said signal, said amplifier means having an input circuit and an output circuit, means coupling said signal producing means and said input circuit, means coupling said output circuit and said motor means, and means for supplying said signal producing means, said amplifier means and said motor means with alternating electrical energy of fixed frequency and predetermined phase relationships, said energy supplying means comprising a transformer having a primary winding and at least three secondary windings, means connecting one of said secondary windings to said signal producing means, means connecting a second of said secondary windings to said amplifier means, means connecting a third of said secondary windings and said motor means, and means including a battery and an inverter for supplying said primary winding with alternating electrical energy.

16. Electrical control apparatus, comprising in combination, a load device to be controlled, reversible electrical motor means for controlling said load device, means including a device responsive to a condition indicative of the need for operation of said load device for producing an alternating electrical signal of a phase dependent upon the direction in which said load device needs to be operated, amplifier means for controlling the direction of operation of said motor means in accordance with the phase of said signal, said amplifier means having an input circuit and an output circuit, means coupling said signal producing means and said input circuit, means coupling said output circuit and said motor means, and means for supplying said signal producing means, said amplifier means and said motor means with alternating electrical energy of fixed frequency and predetermined phase relationships, said energy supplying means comprising a transformer having a primary winding and a plurality of secondary windings, means connecting one of said secondary windings to said signal producing means, means connecting a second of said secondary windings to said amplifier means, means connecting a third of said secondary windings and said motor means, and means including a battery and an inverter for supplying said primary winding with alternating electrical energy.

17. In combination, an aircraft, means defining a space within said aircraft, duct means for supplying air to said space, means for utilizing the motion of said aircraft to induce a flow of air through said duct means, heater means in said duct means, means for controlling the amount of heat transferred by said heater to the air flowing through said duct means, a first temperature responsive resistance element, means for mounting said element in a position exposed to the temperature of the air in said space, a second temperature responsive resistance element, means for mounting said second element in said duct means on the up-stream side of said heater means, a third temperature responsive resistance element, means for mounting said third element in said duct means in the path of air discharged from said heater means, one of said elements having a resistance at least ten times that of each of the other two elements, a bridge circuit including all said elements in such a manner that a change in any of said elements in a certain sense unbalances the bridge circuit in the same sense, and means responsive to unbalance of said bridge circuit to operate said heat transfer controlling means.

18. In electrical temperature control apparatus for an aircraft having heat producing means and means for utilizing the flow of air caused by motion of said aircraft to conduct air into heat exchange relation with said heat producing means, means for modulatingly controlling the amount of heat transferred from said heat producing means to said air, an element having an appreciable temperature coefficient of resistance and exposed to a temperature within said aircraft indicative of the need for operation of said heat transfer control means, a normally substantially balanced electrical network including said element, an electronic amplifier having an input circuit and an output circuit, means for rebalancing said network, electrical motor means for operating said heat transfer control means and said rebalancing means simultaneously, a continuously conductive electrical connection between said network and said input circuit, and another continuously conductive electrical connection between said output circuit and said motor means.

19. In electrical temperature control apparatus for an aircraft having an engine and means for utilizing the flow of air caused by motion of said aircraft to conduct air into heat exchange relation with said engine to cool the same, means for modulatingly controlling the flow of air into heat exchange relation with said engine, an element having an appreciable temperature coefficient of resistance and exposed to the temperature of said engine, a normally substantially balanced electrical network including said element, an electronic amplifier having an input circuit and an output circuit, means for rebalancing said network, electrical motor means for operating said air flow controlling means and said rebalancing means simultaneously, a continuously conductive electrical connection between said network and said input circuit, and another continuously conductive electrical connection between said output circuit and said motor means.

WILLIS H. GILLE.